United States Patent
Barthel et al.

(10) Patent No.: US 7,185,262 B2
(45) Date of Patent: Feb. 27, 2007

(54) METHOD AND DEVICE FOR MONITORING A DATA PROCESSING AND TRANSMISSION

(75) Inventors: Herbert Barthel, Herzogenaurach (DE); Klaus Breu, Edelsfeld (DE); Heiner Fuchs, Erlangen (DE); Andreas Schenk, Erlangen (DE); Hartmut Schütz, Heroldsbach (DE); Markus Walter, Bamberg (DE)

(73) Assignee: Siemens Aktiengesellschaft, Munich (DE)

(*) Notice: Subject to any disclaimer, the term of this patent is extended or adjusted under 35 U.S.C. 154(b) by 616 days.

(21) Appl. No.: 10/451,117

(22) PCT Filed: Dec. 5, 2001

(86) PCT No.: PCT/DE01/04559

§ 371 (c)(1),
(2), (4) Date: Oct. 29, 2003

(87) PCT Pub. No.: WO02/50637

PCT Pub. Date: Jun. 27, 2002

(65) Prior Publication Data

US 2004/0054501 A1  Mar. 18, 2004

(30) Foreign Application Priority Data

Dec. 19, 2000  (DE) .................................. 100 63 350

(51) Int. Cl.
*H03M 13/00* (2006.01)
*G06F 11/00* (2006.01)

(52) U.S. Cl. .................. 714/758; 714/776; 714/38
(58) Field of Classification Search ............... 714/758, 714/776, 38
See application file for complete search history.

(56) References Cited

U.S. PATENT DOCUMENTS

| | | | | | |
|---|---|---|---|---|---|
| 3,866,175 | A | * | 2/1975 | Seifert et al. | 340/825.52 |
| 4,096,567 | A | * | 6/1978 | Millard et al. | 707/10 |
| 5,381,540 | A | * | 1/1995 | Adams et al. | 710/49 |
| 5,613,002 | A | * | 3/1997 | Kephart et al. | 726/24 |
| 5,758,060 | A | * | 5/1998 | Little et al. | 714/30 |
| 5,862,315 | A | * | 1/1999 | Glaser et al. | 714/11 |
| 5,974,529 | A | * | 10/1999 | Zumkehr et al. | 712/41 |

FOREIGN PATENT DOCUMENTS

| | | |
|---|---|---|
| DE | 694 06 571 T2 | 3/1998 |
| EP | 0 606 803 A1 | 7/1994 |
| EP | 0 615 188 A1 | 9/1994 |
| EP | 1 063 591 A2 | 12/2000 |

* cited by examiner

*Primary Examiner*—Joseph Torres
(74) *Attorney, Agent, or Firm*—Staas & Halsey LLP

(57) ABSTRACT

Data processing and transmission is monitored in a data processing unit. The data processing unit has a plurality of software modules, between which data is exchanged, a check sum is allocated to the data of a data transmission, which, in selected software modules is advanced by a plurality of places through one of the software modules.

13 Claims, 3 Drawing Sheets

METHOD AND DEVICE FOR MONITORING A DATA PROCESSING AND TRANSMISSION

CROSS REFERENCE TO RELATED APPLICATIONS

This application is based on and hereby claims priority to PCT Application No. PCT/DE01/04559 filed on 5 Dec. 2001 and German Application No. 100 63 350.1 filed on 19 Dec. 2000, the contents of which are hereby incorporated by reference.

BACKGROUND OF THE INVENTION

The invention relates to a method and an apparatus for monitoring data processing and data transmission in a data processing unit, for example in an automation system, in a programmable logic controller or in a personal computer.

Normally, a distinction is drawn between data processing units on the basis of their use in safety-relevant systems, so-called "failsafe" systems, and non-safety-relevant systems. The general aim in "safe computer systems", or so-called "failsafe" systems, is that data is processed at the right time and without being corrupted. In the event of communication, that is to say when data is interchanged between software modules in an individual data processing unit or between different data processing units, care is taken in particular to ensure that the data arrives at the correct time and that the data sequence is correct. The arrival of the data at the correct time may, for example, be checked by confirming the arrival of a data signal when data communication takes place by sending back so-called "acknowledgement" to the transmitter of the data signal.

In order to check whether an error may have occurred during the data transmission, a checksum is normally associated with a data packet, and is transmitted with it. This may be, for example, a so-called CRC ("Cyclic Redundancy Check"), which may be a test signal that has been produced by a scrambling code on the basis of a polynomial.

Furthermore, an individual data processing unit may comprise "safe" and "non-safe" software modules, and a computer system may comprise "safe" assemblies with a "non-safe" assembly connected between them. The "non-safe" software module or the "non-safe" assembly in this case has so-called "firmware", for example a manufacturer-specific operating system and/or a user program. This "firmware" in this case does not have certification in accordance with the safety requirements for the relevant data processing unit or the relevant computer system, with regard to its reliability and/or availability. Thus, if the safety requirements are particularly stringent, even after safety certification has already been carried out, a software change and/or hardware change resulting from a product change may need to be recertified, which may lead to a restriction to the availability of the data processing unit or of the entire computer system. Furthermore, such recertification processes are particularly time-consuming and costly.

DE 694 06 571 T2 discloses a method for monitoring the correct execution of a multitask computer program by at least one processor, in which the tasks in the program transmit messages and are executed taking account of such messages, with each message containing a time marker and each task which transmits a message working out an execution key, which is associated with this message and identifies a causal dependency relationship with the message, which is defined by the chronological sequence of the execution of the tasks and the chronological sequence of taking account of the messages by these tasks which have led to the transmission of this message by this transmitting task, characterized in that each execution key (formed bit-by-bit by an exclusive-OR logic operation from binary words which each contain the binary representation of a task identification or of a message identification, or of a message time marker, with the bits in each binary word having been permutated previously and cyclically with different starts for each word, and with at least one of the tasks transmitting one or more such messages as a response to taking into account at least one input message, and a comparison being carried out between the execution key which is worked out in the final place by a task of the program and a reference key which is worked out on the basis of the input message and allows detection of an execution error.

SUMMARY OF THE INVENTION

One aspect of the invention is based on the object of specifying a method for monitoring the data processing and data transmission in a data processing unit, by which the operation of "non-safe" software modules and/or assemblies can be checked particularly easily and reliably.

The method and apparatus are in this case based on the idea that the functionality of software modules or assemblies can be checked particularly easily by also transmitting suitable information, which characterizes this functionality. This can be done in a particularly advantageous and resource-saving manner by also using an information element that has to be transmitted in any case for this purpose. The checksum which has to be transmitted in any case is provided for this purpose and is modified in a suitable manner for joint transmission of the information that characterizes the functionality.

The criterion for the data passing correctly through the selected software modules whose functionality is to be monitored may in this case be predetermined in a suitable manner, and as a function of the purpose of the software module. For example, it would be possible to check that the data has passed through correctly by using the software module to be monitored, when data arrives, to determine that this software module is active and that the data is passed on at the right time, within an action time which can be predetermined. Alternatively or additionally, the criterion for the data passing through correctly could, however, also be made dependent on the presence of further, for example external, conditions, such as a signal from an upstream software module arriving at the right time.

In order reliably to avoid loss of information in the checksum in this case, the information elements which fall out of the word length available for the checksum during the shifting process are advantageously reinserted at the opposite end, in the form of a rotation.

A change such as this to protection information in the form of a modified checksum provides on-line verification of the activity or the execution, that is to say of the data processing, of the relevant software module. In this case, the checksum is changed in a reversible manner within those software modules whose active time is intended to be checked continuously. Once the checksum which has been modified in this way has arrived at the receiver, the reversible actions are reversed once again there, corresponding to the nominal number of active software modules. Information about the totality of all the software modules traversing correctly is in this case available in compressed form in the modified checksum, so that it is possible by a suitable comparison with an expected value or a nominal state to reliably identify whether all the software modules have worked without errors. Incorrect execution or incorrect data transmission and, to a particular extent, failure of the data processing would be identified at the receiving end by virtue of corrupted protection information—namely an insufficiently modified checksum. Such modification of the checksum by shifting or rotation of a number of digits which can be predetermined furthermore preferably makes it possible distinguish between the selected software modules which are present in the data processing unit, on the basis of active and inactive software modules or assemblies.

The received data is expediently used at the receiving end to determine the checksum once again, and the received modified checksum is inverse-shifted by the number of active selected software modules expected at the transmission end, with an inverse modified checksum that results from this being compared with the checksum determined from the received data. Alternatively or additionally, a further checksum is likewise interchanged with the data and is used as the basis for the comparison. This allows multiply redundant protection information for verification of the execution of the data processing in the form of the transmitted original checksum, of the checksum calculated once again on the basis of the transmitted data, of the modified checksum and of its inverse processing, as well as comparison with the original checksum.

In networked computer systems, the data is preferably interchanged between software modules in different data processing units, with the checksum to be modified being formed in the transmitting data processing unit. The checksum is then inverse-modified in the stated manner while passing through the selected software modules in the receiving data processing unit. This results in information for identification of errors in the data transmission of two or more data processing units which interact with one another, and during the data processing on which this based. Depending on the nature and the embodiment of the networked computer system—tree topology or star structure—the way in which the checksum is modified is preferably extended by n-times operations. When data is interchanged via n instances, the operation is, for example, in this case carried out n-times in the transmitter, with each instance carrying out the inverse operation once, in order to pass it on. The original protection information is thus once again received in the final receiver in the form of the originally transmitted checksum. Alternatively or additionally, further mathematical operations may be used, for example n-times potentiation of the checksum, as a modification to the checksum.

So-called test programs for the relevant data processing unit are advantageously selected as software modules in which shifting or reversible modification of the checksum is carried out in order to verify the functionality or availability of these software modules. Two of these test programs may in this case each surround a "non-safe" software module in the form of embedding or encapsulation, and can continuously monitor for correct operation, for example by runtime monitoring. The test programs which are predetermined as selected software modules are in this case themselves continuously monitored for availability and activity on the basis of the checksum, so that the safe and reliable operation of the embedded software modules can be deduced indirectly from the lack of error messages.

In this case, when a data processing unit is modified or adapted by intermediate "non-safe" software modules and/or "non-safe" assemblies, the data processing and/or data transmission can be checked in a manner which ensures a safety standard corresponding to certification by integrating the non-safe software modules or assemblies in safe program sections—in the test program (=a so-called failsafe program).

This failsafe program, which embeds one or more software modules, for example new firmware or application software, or assemblies, for example new input/output assemblies, is in this case checked for activity and availability. In other words, this is based on the idea that, for example, reliable operation of the firmware—and hence acceptance of non-safe software modules and/or assemblies that is provided in the manner of general certification—can be verified continuously if it can be shown on a continuous basis that the failsafe program which is monitoring the firmware is present and is also active. In this case, the checksum is shifted by one digit in each failsafe program that protects the firmware (=rotated; in this case, rotation to the right is provided). Thus, after leaving the failsafe program that protects the firmware, the checksum has been shifted or rotated by a total of N digits, where N corresponds to the number of failsafe programs that are present or active. When the checksum that has been modified in this way arrives in the downstream, protected program section, the checksum is shifted or rotated in the opposite direction to the original shift or rotation, through the number of expected failsafe programs. If a match is in this case found with the checksum determined from the received payload data, this provides a verification that all the failsafe programs that have been provided and are required are also active. In this case, it can thus be assumed that the embedded firmware is operating correctly.

A runtime is preferably determined for the data transmission between the software modules or data processing units and/or the data processing in a software module or in a data processing unit, and is compared with a predetermined value. The runtime may in this case be determined by an acknowledgement. The monitoring for such a program runtime or data runtime as an error parameter allows protection which largely corresponds to certification. In this case, a system error or fault is identified by a specified time being exceeded for the processing of a software module or of the firmware. This is based on the concept that a time delay in the critical program section or in the "non-safe" software module can be detected by the test program or failsafe program which surrounds the software module, so that a problem which is characteristic of data processing is identified immediately.

The advantages which are achieved are, in particular, that protection information both for identification of errors during data processing and for identification of errors during transmission can be obtained by modification and subsequent inverse processing of an existing checksum. This may be carried out indirectly by continuously using the modification of the checksum to monitor the activity of safety programs or test programs in a particularly simple manner that conserves resources. In particular, this ensures that the availability of "non-safe" software modules or assemblies is monitored. In addition, a defect in the data processing or data transmission can be identified immediately, at the latest once a predetermined runtime has elapsed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
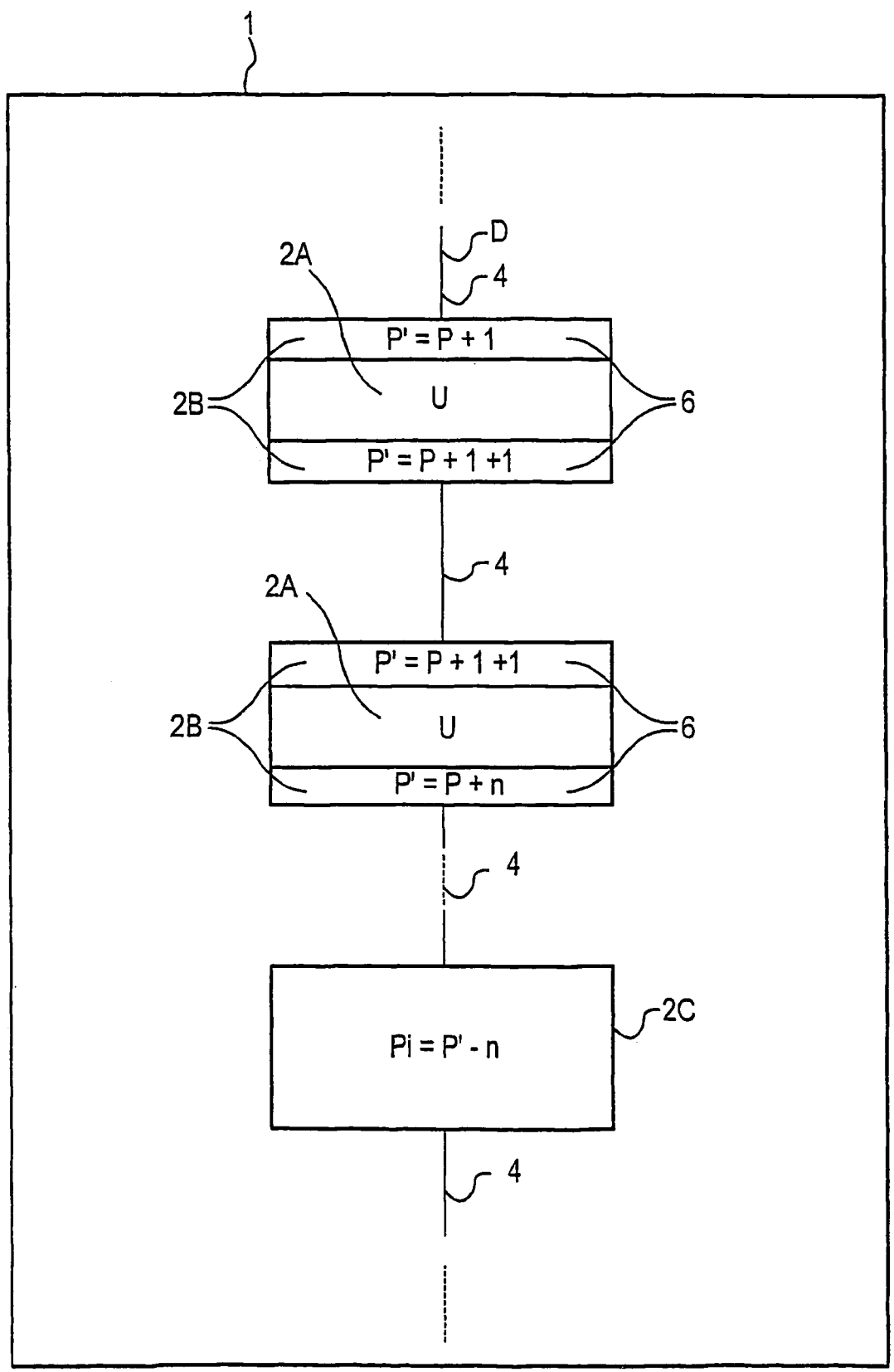
FIG. 1 shows, schematically, a data processing unit having two or more software modules, and the test program surrounding them.

Reference will now be made in detail to the preferred embodiments of the present invention, examples of which are illustrated in the accompanying drawings, wherein like reference numerals refer to like elements throughout.

Mutually corresponding parts are provided with the same reference symbols in all the figures.

FIG. 1 shows a data processing unit 1 having two or more software modules 2A and 2B, which describe a program sequence on which the data processing unit 1 is based. The software modules 2A and 2B differ in their function, in particular safety function, and/or in the nature of their certification. FIG. 1 shows two non-safe software modules 2A and four safe software modules 2B. The non-safe software modules 2A are software programs which have been modified after certification or acceptance of the data processing unit 1. The software modules 2B are software programs which have not been modified since their commissioning and certification. The software modules 2B are in this case in the form of test programs for the software modules 2A, with two software modules 2B in each case being associated with each software module 2A in the form of embedding or encapsulation, and surrounding it for data flow purposes.

During data processing, data D is interchanged between the software modules 2A and 2B on logical channels 4 (not hardware transmission units), with the data being interchanged in one direction or in both directions depending on the nature of the link and on the functionality of the software on which this is based.

In order to check the running of the program (=data processing) and/or the data flow (=data transmission), in particular of the non-safe software modules 2A, of the data processing unit 1, the one set of software modules 2B which in each case surround the software of the non-safe software modules 2A is in each case in the form of a test program 6. The software modules 2B which form the test program 6 for a software module 2A in this case continuously check correct operation or the availability of the respective software module 2A. This may be done, for example, by a runtime measurement, which is then used to deduce correct availability of the software module 2A when a signal which is produced by a software module 2B which is connected upstream of it in the data flow direction arrives within a predetermined time limit in the software module 2B that is connected downstream from it. The activity and continuous availability of the software modules 2B which are selected for protection purposes is thus itself checked continuously in that, when the data D passes through the selected software module 2B, a checksum P which is associated with this data D is shifted, in particular rotated, in each selected software module 2B, in the manner of a reversible modification, through a number of digits n associated with the respective software module 2B.

In FIG. 1, by way of example, a message with data D from another software module 2A or 2B is received in a non-safe software module 2 A. At the receiving end, the data D is associated in the respective test program 6 for the software module 2A with a checksum P which, if it is passed correctly through the selected software module 2B, is modified as follows: P'=P+1. "Passing through correctly" is in this case detected on the basis of a criterion which can be predetermined, and which can be used as a basis for reliably deducing the activity of the respective selected software module. This may, for example, be a runtime criterion. In order to modify the checksum, the checksum P determined from the data D is shifted through one digit to the left or right. Thus, in this case, all the selected software modules 2B have a "1" associated with them as the number of digits. The software for the relevant software module 2A is processed on the basis of the data D. Once the software has been executed, and the data processing has thus taken place, the modified checksum P' is once again shifted through an individual digit n provided that correct data processing is also found in the selected software module which is connected downstream from the software module 2A for data flow purposes. Thus, in the exemplary embodiment, the checksum P is shifted in total through 2 digits in accordance with P'=P+1+1 in order to form the modified checksum P', as the data passes through the first software module 2A, as seen in the data flow direction, and through the selected software modules 2B which surround them. Such modification of the checksum P on the basis of the processed software thus on the one hand also provides verification of the availability of the selected software modules 2B for correct data processing in the software module 2A, and on the other hand provides verification of the availability of the selected software modules 2B as such.

Appropriate modification of the checksum P takes place in the second software module 2A, as seen in the data flow direction, and in the selected software module 2B associated with it.

Depending on the nature and the embodiment, the modified checksum P' is checked for correctness in a downstream, preferably safe, software module 2C. To do this, the modified checksum P' is inverse-shifted through the number of selected software modules 2B that are expected to be active. As shown in the example illustrated in FIG. 1, the inverse-modified checksum Pi is determined as follows: Pi=P−1−1. The inverse-modified checksum Pi is compared with the checksum P determined from the relevant data D. If Pi and P match, then this provides verification that the predetermined and required programs, in particular the test programs 6 for the non-safe software modules 2A, are active, thus representing correct operation of non-safe software, for example firmware, which is embedded in safe software.

Figure 2:
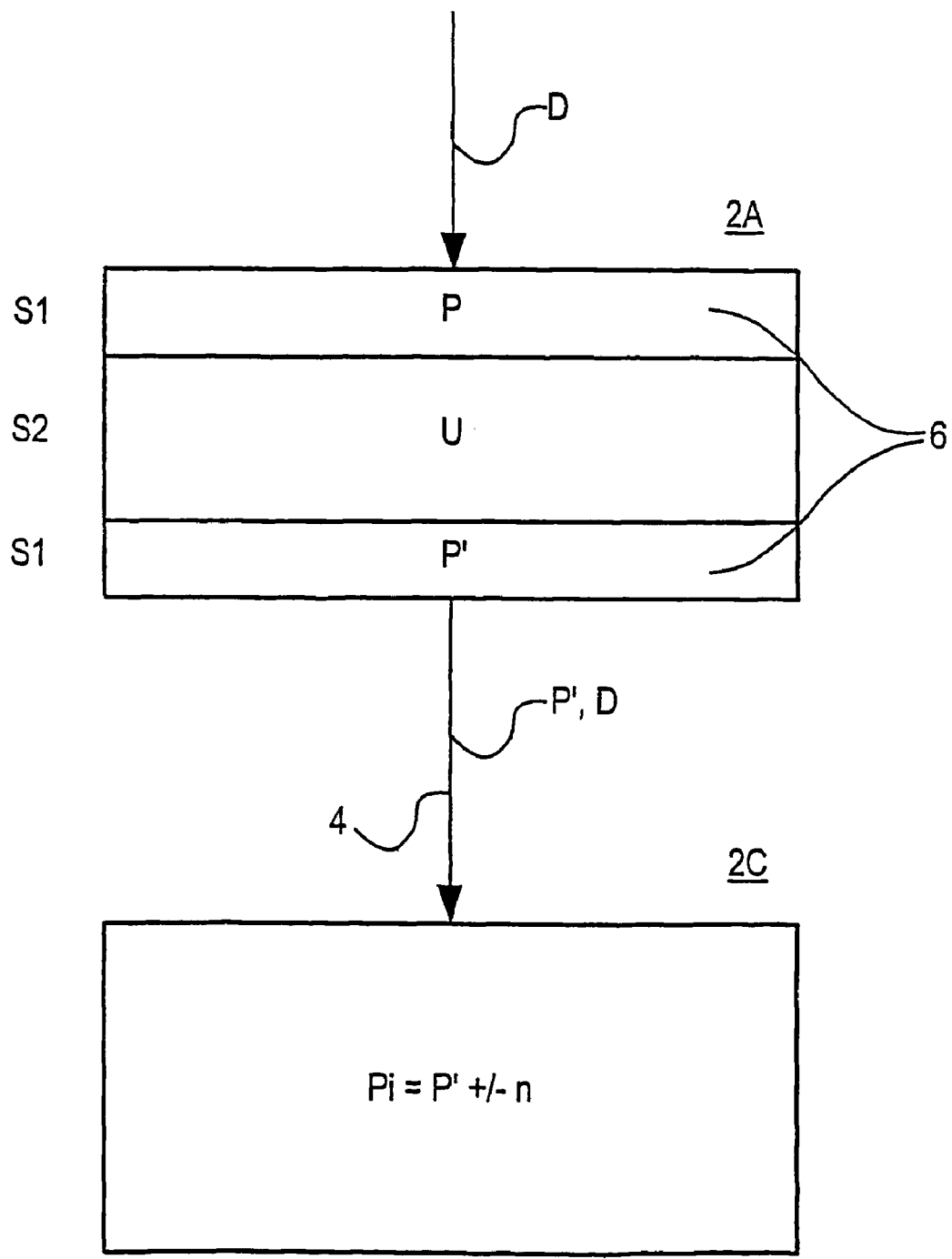
FIG. 2 shows, schematically, the test program.

The test program 6 which is formed by the selected software modules 2B and surrounds the software modules 2A in order to form the modified checksum P' is illustrated schematically in FIG. 2. The test program is preferably provided only for monitoring the non-safe software modules 2A, as shown in FIG. 1. The test program 6 in this case not only monitors a program runtime which characterizes the program execution of the associated software module 2A, but also carries out the modification of the checksum P.

In order to check the program execution and hence the data processing as well as the activity of the test program 6, the checksum P which is associated with the data D is modified on the input side in a first step S1, as described, in this software module 2B, if the data processing is carried out correctly. The reception time of the data D is also stored, depending on the nature and embodiment. Subsequently, in a second step S2, the software U (which is surrounded by the test program 6) of the software module 2A is processed. In a third step S3 after program execution and using the stored reception time and the current time, a program runtime is determined for the processing program and for the software U, and is compared with a predetermined value. This provides particularly simple verification for compliance with the expected program runtime. If the program runtime is exceeded, it can be deduced that there is an error or fault in the data processing—in the program execution. If no such error or fault is identified and, apart from this, it is also found that the data D has been processed further correctly in the downstream software module 2B, the checksum P is once again shifted through one digit n=1 there. The modified checksum P' that results from this is sent to a further software module 2A or 2B, in particular to a safe software module 2B, which communicates with this software module 2A.

In order to check the data transmission and the data processing of the non-safe software module 2A, the modified checksum P' is inverse-processed in a safe software module 2C, which receives the modified checksum P' via the logical channel 4. The modified checksum P' is in this case shifted through the number of digits n, which corresponds to the total number of preceding selected software modules 2B (whose activity is to be monitored) in the data processing unit 1, and thus corresponds to the active test programs 6. Alternatively, it is possible to provide for each selected software module 2B to have an associated number of digits n on an individual basis, through which the checksum P is shifted when the data D passes through this software module 2B correctly. For example, the checksum P is rotated through two digits (instead of through 1 digit as in the past) in a specific software module 2B. Overall, this then results in rotation through 3 digits (instead of 2). It is then possible to identify in the final comparison of the checksum P whether all the test programs 6 or failsafe programs were actually active, on the basis of the contribution assigned to them. If this is not the case, then it is possible to identify from a quantitative evaluation which selected software module 2B was not active.

The checksum P is preferably shifted through one digit n on first initialization. In consequence, in contrast to the situation when, specifically, each test program 6 rotates through only one digit n, it is possible to identify that state which occurs when, for example, the first test program 6 rotates through two digits—that is to say becomes active twice—but the second test program 6 does not rotate at all.

Figure 3:
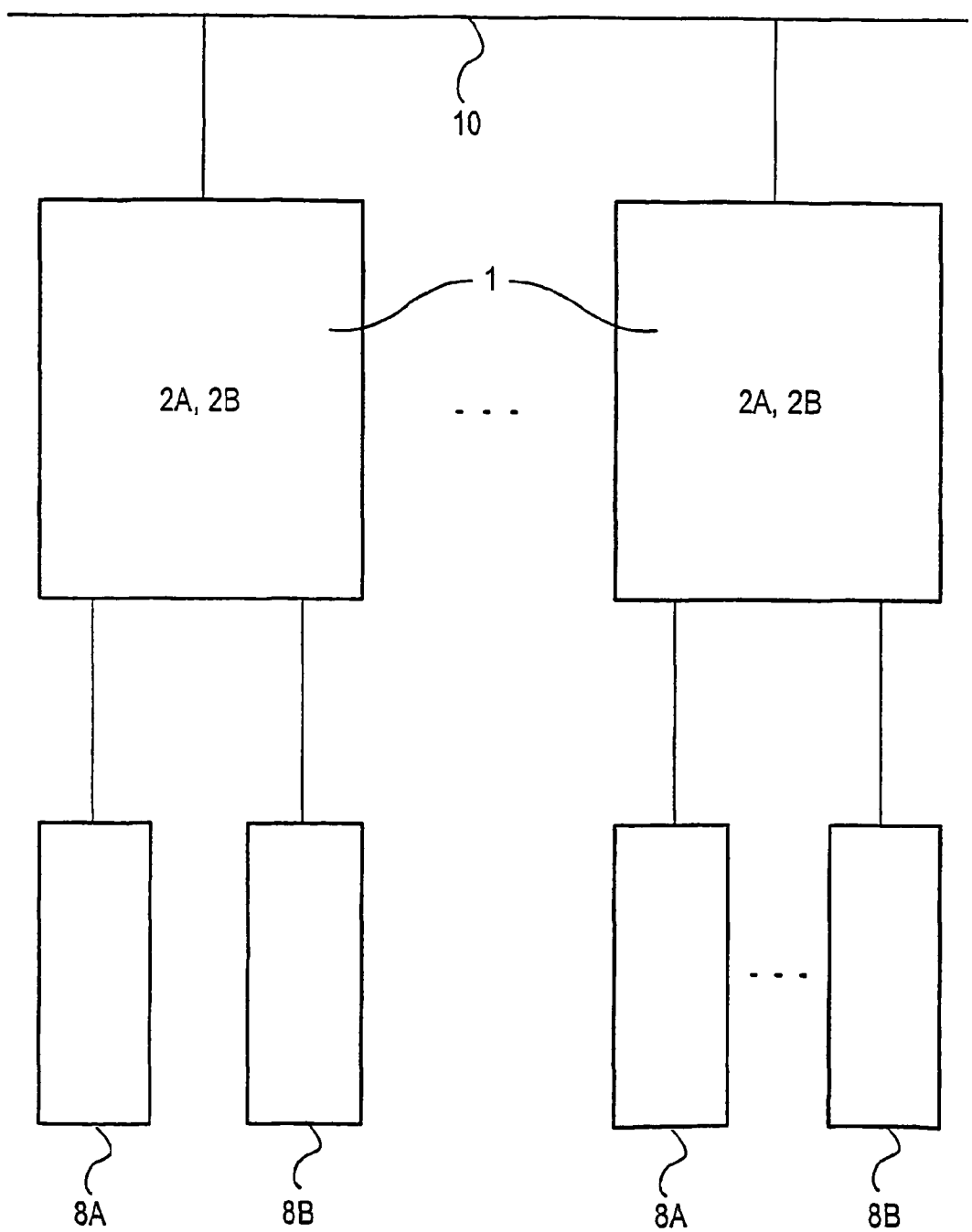
FIG. 3 shows, schematically, a plurality of data processing units, which communicate with one another, as shown in FIG. 1.

FIG. 3 shows a computer system which comprises two or more data processing units 1. Data D is interchanged by a data transmission unit 10, for example a bus system, between the data processing units 1 and their respectively associated software modules 2A, 2B and/or assemblies 8A, 8B. The assemblies 8A in this case represent non-safe assemblies, for example memory assemblies, which have been replaced or added to after commissioning of the computer system. The assemblies 8B are safe assemblies, which have been tested in accordance with the specified safety requirements in the computer system, for example input or output assemblies.

The modified checksum P' is preferably formed in the transmitting data processing unit 1. In contrast, the inverse-modified checksum Pi is formed, and it is compared with the checksum P formed from the received data D, in the received data processing unit 1. Depending on the embodiment, the respective data processing unit 1 may have a test program 6 which surrounds all the software modules 2A, 2B, in order to form the modified checksum P'. Alternatively or additionally, individual software modules 2A, 2B, or a group of software modules 2A which are combined in accordance with a specification may be surrounded by an associated test program 6 in order to form the modified checksum P'. The inverse-modified checksum Pi is preferably determined in a safe assembly 8B or in a safe software module 2B. The modified checksum P and/or the inverse-modified checksum Pi are/is in this case formed in the manner described above.

Depending on the embodiment of the computer system, the data interchange may essentially be cross-traffic for communication in one hierarchy level, or communication in two or more hierarchy levels, in the vertical direction. The data communication by the data transmission unit 8 or of the bus system is taken into account in particular by the presence of the unchanged checksum P in the bus system. This ensures that the modification as described above is not visible for external equipment, such as scanners, printers, other computer networks, etc., so that there is no load on the other data traffic.

Depending on the complexity of the individual data processing unit 1 or of the computer system, the nature of the modification to the checksum P may be extended by n-times operations, for example the operation is carried out n times in the transmitting data processing unit 1 when a data interchange has to take place via n instances, with each instance (=receiving data processing unit 1) carrying out the inverse operation once, in order to pass it on. By way of example, the checksum P is potentiated n-times as an n-times operation.

The reversible change, as described above, to protection information—the checksum P—for on-line verification of the activity or availability of selected software modules 2B by the test program 6 ensures that software changes or assembly changes in the data processing unit 1 are checked and monitored for their active availability with respect to data processing and/or data transmission, in that non-safe software modules 2A or assemblies 8A are integrated in safe program sections.

The invention has been described in detail with particular reference to preferred embodiments thereof and examples, but it will be understood that variations and modifications can be effected within the spirit and scope of the invention.

The invention claimed is:

1. A method for monitoring data processing and transmission in a data processing unit having two or more software modules, comprising:
   interchanging data between the software modules, the data having an associated checksum; and
   shifting the checksum as the data passes correctly through each of the software modules, the checksum being shifted in the software modules by a number of digits corresponding to a number of correct software module data passes.

2. The method as claimed in claim 1, wherein
   the data is received at a receiver,
   the receiver inversely shifts the checksum and produces an inverse modified checksum, the checksum being inversely shifted by a number of digits corresponding to an expected number of active software modules,
   the receiver determines a reproduced checksum from the data, and
   the inverse modified checksum is compared with the reproduced checksum.

3. The method as claimed in claim 1, wherein
   the data is interchanged between a transmitting data processing unit and a receiving data processing unit, each containing at least one software module, the transmitting data processing unit shifts the checksum, and the receiving data processing unit inversely shifts the checksum.

4. The method as claimed in claim 1, wherein a test program in the software module shifts the checksum.

5. The method as claimed in claim 1, wherein
a runtime is determined for data transmission, and
the runtime is compared with a predetermined value.

6. The method as claimed in claim 2, wherein
the data is interchanged between a transmitting data processing unit and a receiving data processing unit, each containing at least one software module,
the transmitting data processing unit shifts the checksum, and
the receiving data processing unit inversely shifts the checksum.

7. The method as claimed in claim 6, wherein a test program in the software module or data processing unit shifts the checksum or inversely shifts the checksum.

8. The method as claimed in claim 7, wherein
a runtime is determined for data transmission, and
the runtime is compared with a predetermined value.

9. An apparatus for monitoring data processing and data transmission in a data processing unit, comprising:
two or more logical channels for interchanging data having a checksum associated therewith; and
a plurality of software modules communicating through the logical channels, the software modules including at least one checksum software module, each checksum software module modifying the checksum if the associated data passes successfully through the checksum software module, the checksum being modified by shifting the checksum a number of digits such that a total checksum shift corresponds with a total number of correct checksum software module passes.

10. The apparatus as claimed in claim 9, further comprising a receiving unit to inversely shift the checksum and produce an inverse modified checksum, the checksum being inversely shifted by a number of digits corresponding to an expected number of checksum software modules.

11. The apparatus as claimed in claim 10, wherein the receiver determines a reproduced checksum from the data and compares the inverse modified checksum with the reproduced checksum.

12. The apparatus as claimed in claim 9, wherein the apparatus comprises a plurality of checksum software modules.

13. The apparatus as claimed in claim 12, further comprising at least one non-checksum software module, each non-checksum software module being imposed between two checksum software modules.

* * * * *